United States Patent
Simon et al.

(10) Patent No.: US 9,414,221 B1
(45) Date of Patent: Aug. 9, 2016

(54) SYSTEM AND METHOD FOR DETERMINING COMPROMISED DRIVING

(71) Applicants: Sascha Simon, Warwick, NY (US); Zvi Huber, Great Falls, VA (US)

(72) Inventors: Sascha Simon, Warwick, NY (US); Zvi Huber, Great Falls, VA (US)

(73) Assignee: APIO SYSTEMS, INC., Rochelle Park, NJ (US)

( * ) Notice: Subject to any disclaimer, the term of this patent is extended or adjusted under 35 U.S.C. 154(b) by 0 days.

(21) Appl. No.: 14/664,409

(22) Filed: Mar. 20, 2015

Related U.S. Application Data

(63) Continuation-in-part of application No. 14/136,467, filed on Dec. 20, 2013, which is a continuation-in-part of application No. 14/105,934, filed on Dec. 13, 2013, which is a continuation-in-part of application No. 14/105,744, filed on Dec. 13, 2013, now Pat. No. 8,989,952, which is a continuation-in-part of application No. 14/095,156, filed on Dec. 3, 2013, which is a continuation-in-part of application No. 14/072,231, filed on Nov. 5, 2013, now Pat. No. 9,333,946.

(Continued)

(51) Int. Cl.

| | |
|---|---|
| *H04W 8/22* | (2009.01) |
| *H04W 24/08* | (2009.01) |
| *H04W 4/14* | (2009.01) |
| *H04W 4/02* | (2009.01) |
| *H04R 1/08* | (2006.01) |
| *G10L 25/78* | (2013.01) |
| *G01B 21/00* | (2006.01) |

(52) U.S. Cl.
CPC ............. *H04W 8/22* (2013.01); *G01B 21/00* (2013.01); *G10L 25/78* (2013.01); *H04R 1/08* (2013.01); *H04W 4/02* (2013.01); *H04W 4/14* (2013.01); *H04W 24/08* (2013.01)

(58) Field of Classification Search
CPC .......... H04W 8/22; H04W 4/02; H04W 24/08; H04W 4/14; G10L 25/78; H04R 1/08; G01B 21/00
See application file for complete search history.

(56) References Cited

U.S. PATENT DOCUMENTS

| | | | |
|---|---|---|---|
| 8,417,268 B1 * | 4/2013 | Halferty ................ | H04W 4/027 455/410 |
| 8,731,530 B1 * | 5/2014 | Breed ............... | H04M 1/72577 455/414.1 |
| 2010/0035632 A1 * | 2/2010 | Catten ................... | H04W 24/08 455/456.1 |
| 2010/0113073 A1 * | 5/2010 | Schlesener ............. | H04W 4/02 455/466 |

(Continued)

*Primary Examiner* — Nathan Mitchell
(74) *Attorney, Agent, or Firm* — John T. Whelan

(57) ABSTRACT

A device is provided for use with a database having stored therein, a plurality of signatures corresponding to a plurality of actions, respectively. The device includes: a mode determining component that determines whether the device is in a predetermined mode; a device location determining component that determines whether the device is located in a predetermined location; a parameter detecting component operable to detect a predetermined parameter and to generate an action signature based on the detected predetermined parameter; an accessing component operable to access one of the plurality of signatures from the database; and a mode controlling component operable to modify operation of the device based on the comparison signal when said mode determining component determines that the device is operating in the predetermined mode and when the location determining component determines that the device is located in the predetermined location.

20 Claims, 9 Drawing Sheets

Related U.S. Application Data

(60) Provisional application No. 61/740,814, filed on Dec. 21, 2012, provisional application No. 61/740,831, filed on Dec. 21, 2012, provisional application No. 61/740,851, filed on Dec. 21, 2012, provisional application No. 61/745,677, filed on Dec. 24, 2012, provisional application No. 62/033,290, filed on Aug. 5, 2014, provisional application No. 62/033,284, filed on Aug. 5, 2014, provisional application No. 62/033,278, filed on Aug. 5, 2014, provisional application No. 61/955,995, filed on Mar. 20, 2014.

(56) References Cited

U.S. PATENT DOCUMENTS

| | | | |
|---|---|---|---|
| 2010/0234047 A1* | 9/2010 | Lipovski | H04M 19/044 455/456.4 |
| 2010/0273522 A1* | 10/2010 | Ota | H04R 3/00 455/550.1 |
| 2011/0039572 A1* | 2/2011 | Lamb | H04M 1/6075 455/456.1 |
| 2011/0076996 A1* | 3/2011 | Burton | H04M 1/6075 455/418 |
| 2012/0231773 A1* | 9/2012 | Lipovski | H04M 1/72552 455/414.1 |
| 2013/0281079 A1* | 10/2013 | Vidal | H04W 8/22 455/418 |
| 2014/0162616 A1* | 6/2014 | Bradley | H04M 1/72577 455/418 |
| 2014/0256303 A1* | 9/2014 | Jones | H04W 4/027 455/418 |
| 2014/0364153 A1* | 12/2014 | Ren | H04W 4/046 455/456.4 |
| 2015/0148019 A1* | 5/2015 | Michaelis | H04M 1/72563 455/418 |
| 2015/0172450 A1* | 6/2015 | Singhal | H04M 1/72577 455/419 |
| 2015/0181414 A1* | 6/2015 | Bretscher | H04W 4/12 455/418 |

* cited by examiner

SYSTEM AND METHOD FOR DETERMINING COMPROMISED DRIVING

The present application claims priority from: U.S. Provisional Application No. 61/740,814 filed Dec. 21, 2012; U.S. Provisional Application No. 61/740,831 filed Dec. 21, 2012; U.S. Provisional Application No. 61/740,851 filed Dec. 21, 2012; and U.S. Provisional Application No. 61/745,677 filed Dec. 24, 2012, U.S. Provisional Application No. 61/955,995 filed Mar. 20, 2014, U.S. Provisional Application No. 62/033,278 filed Aug. 5, 2014, U.S. Provisional Application No. 62/033,284 filed Aug. 5, 2014 and U.S. Provisional Application No. 62/033,290 filed Aug. 5, 2014, the entire disclosures of which are incorporated herein by reference. The present application is a continuation-in-part of U.S. application Ser. No. 14/072,231 filed Nov. 5, 2013, is a continuation-in-part of U.S. application Ser. No. 14/095,156 filed Dec. 3, 2013, is a continuation-in-part of U.S. application Ser. No. 14/105,744 filed Dec. 13, 2013, is a continuation-in-part of U.S. application Ser. No. 14/105,934 filed Dec. 13, 2013 and is a continuation-in-part of U.S. application Ser. No. 14/136,467 filed Dec. 20, 2013, the entire disclosures of which are incorporated herein by reference.

BACKGROUND

Smartphones, tablets and other smart devices enable ever increasing functions and utility in all aspects of life. They are used throughout the day in many situations. Sometimes, smartphones, tablets and other smart devices are used for purposes at the wrong time and place. For example, users may text, talk or surf the internet on a smartphone, but such actions may compromise driving if performed while driving. Further, receiving phone calls or texts may be disruptive if received during a board meeting or during a class.

Some smartphones, tablets and other smart devices may enable a user to switch modes of operation. For example, a user may be able to place his phone into a silent mode to prevent ringing while in class. However, this takes involvement from the user, and additional involvement to return to the previous operational mode.

SUMMARY

The present invention provides a system and method to modify operation of a communication device when the device is in a registered location, when the device is in a registered mode and when registered action is detected.

Various embodiments described herein are drawn to a device is provided for use with a database having stored therein, a plurality of signatures corresponding to a plurality of actions, respectively. The device includes: a mode determining component that determines whether the device is in a predetermined mode; a device location determining component that determines whether the device is located in a predetermined location; a parameter detecting component operable to detect a predetermined parameter and to generate an action signature based on the detected predetermined parameter; an accessing component operable to access one of the plurality of signatures from the database; and a mode controlling component operable to modify operation of the device based on the comparison signal when said mode determining component determines that the device is operating in the predetermined mode and when said location determining component determines that the device is located in the predetermined location.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

Figure 1B:
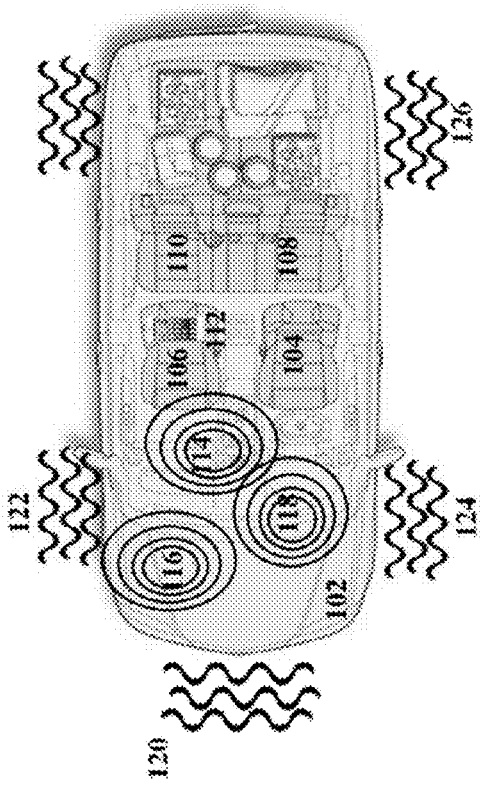
FIGS. 1A-C illustrate the magnetic fields and vibrations associated with a vehicle as detected by a communication device located at three different locations within the vehicle, respectively, in accordance with aspects of the present invention.

Aspects of the present invention are drawn to a system and method for modifying a operation of a communication device when the communication device is in a registered location and when the communication device is in a registered mode of operation that corresponds with the registered location.

As used herein, the term "smartphone" includes cellular and/or satellite radiotelephone(s) with or without a display (text/graphical); Personal Communications System (PCS) terminal(s) that may combine, a radiotelephone with data processing, facsimile and/or data communications capabilities; Personal Digital Assistant(s) (PDA) or other devices that can include a radio frequency transceiver and a pager. Internet/Intranet access, Web browser, organizer, calendar and/or a global positioning system (GPS) receiver; and/or conventional laptop (notebook) and/or palmtop (netbook) computer(s), tablet(s), or other appliance(s), which include a radio frequency transceiver. As used herein, the term "smartphone" also includes any other radiating user device that may have time-varying or fixed geographic coordinates and/or may be portable, transportable, wearable, installed in a vehicle (aeronautical, maritime, or land-based) and/or situated and/or configured to operate locally and/or in a distributed fashion over one or more location(s).

In one non-limiting example embodiment, a communication device, e.g., a smartphone: 1) automatically determines whether it is operating in a predetermined mode; 2) automatically determines whether it is in a predetermined location; and 3) automatically modifies its operation when is determines that it is operating in the predetermined mode (herein-after, "mode" is a mode of operation) and when it determines that it is operating in the predetermined location.

In accordance with aspects of the present invention, a communication device may automatically determine whether it is operating in a predetermined mode by any known method. A predetermined mode is a predefined mode of operation wherein functionality of the device is regulated.

In accordance with aspects of the present invention, a communication device may automatically determine whether the communication device is in a predetermined location by any known method.

With respect the communication device automatically modifying its operation when is determines that it is operating in the predetermined mode and when it determines that it is operating in the predetermined location, the modification may take the form of enabling predetermined functions of the communication device, disabling predetermined functions of the communication device, altering predetermined functions of the communication device and combinations thereof.

For purposes of discussion, consider the situation where a person is driving a vehicle. If the driver were to text or talk on his phone while driving, the driver may compromise his driving. To reduce this likelihood, a communication device in accordance with the present invention may: 1) determine that it is in (or near) the driver's seat, thus indicating that the owner of the phone is driving; 2) determine that the phone is in a vehicle mode, thus indicating that the phone is enable to detect parameters associated with the area within the vehicle; and 3) modify operation of the phone, e.g., disable texting or talking.

In another example, consider the situation where a person is sitting in a hoard room, in a board meeting. If the person's phone where to ring, it may disrupt the meeting. To reduce this likelihood, a communication device in accordance with the present invention may: 1) determine that it is in (or near) the board room, thus indicating that the owner of the phone is in a meeting; 2) determine that the phone is in a board room mode, thus indicating that the phone is enable to detect parameters associated with the board room; and 3) modify operation of the phone, e.g., disable ringing.

Aspects of the present invention will now be described with reference to FIGS. 1A-11.

Figure 1A:
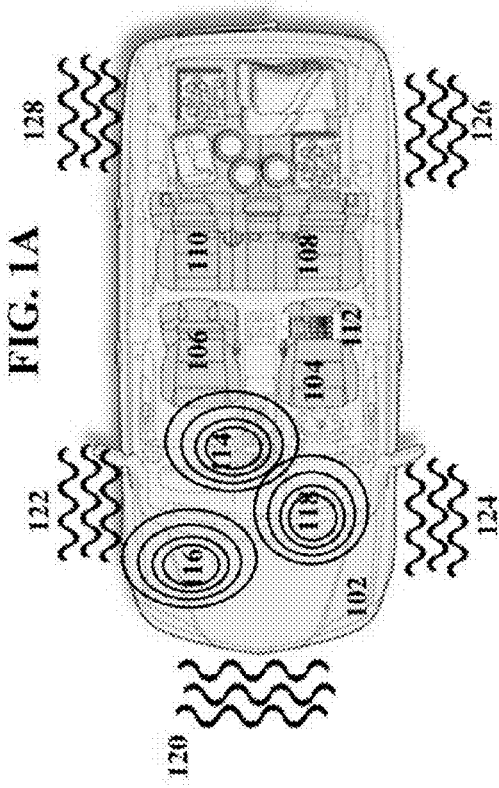
Figure 1C:
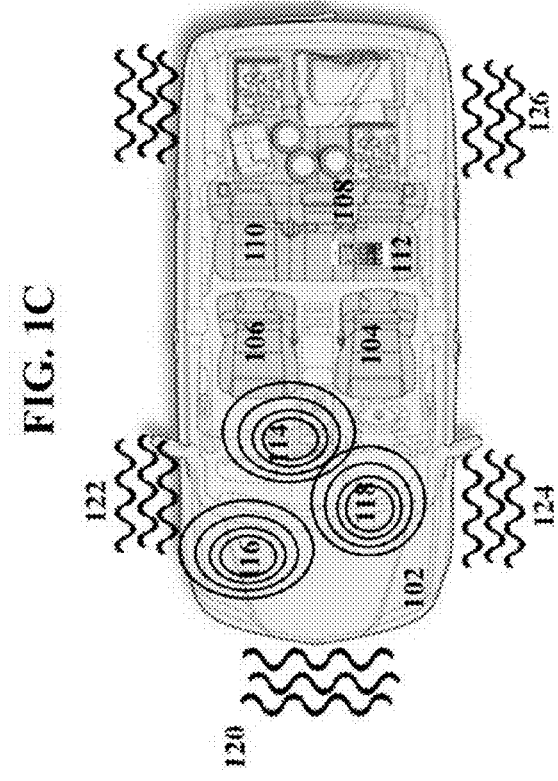

FIGS 1A-C illustrate the magnetic fields and vibrations associated with a vehicle as detected by a communication device located at three different locations within the vehicle, respectively, in accordance with aspects of the present invention.

As shown in FIG. 1A, a vehicle 102 includes a driver seat 104, a from passenger seat 106, a rear passenger seat 108 and a rear passenger seat 110. In this example, a person (not shown) is holding, or having in the immediate vicinity, a communication device 112, e.g., a smartphone, (not shown) in accordance with an aspect of the present invention, wherein the person is sitting in driver seat 104.

While running, electronic portions of vehicle 102 will generate magnetic fields, a sample of which are represented by field lines 114, 116 and 118. Further, the engine of vehicle 102 may generate vibrations represented by lines 120 and the tires rolling on the pavement will generate vibrations represented by lines 122, 124, 126 and 128.

As shown in FIG. 1B, the person (not shown) is holding, or having in the immediate vicinity, communication device 112, while sitting in passenger seat 106. As shown in FIG. 1C, the person (not shown) is holding communication device 112, while sitting in rear passenger seat 108.

In accordance with aspects of the present invention, communication device 112 may detect parameters within vehicle 102 to determine a more exact location of communication device 112. In this example embodiment, communication device 112 may detect the magnetic fields and the vibrations to determine the location of the user within vehicle 102. In accordance with another aspect of the present invention, this location determination may be used to operate communication device 112 in a particular mode, e.g.. enabling predetermined features or functions associated with a specific location and/or disabling other predetermined features or functions associated with the specific location.

For example, the magnitude or vectors of the fields and vibrations as detected by communication device 112 when it is located in driver seat 104 may be compared with similar fields and vibrations associated with driver seat 104. Such a similarity in detected parameters may enable communication device 112 to determine that it is located near diver seat 104.

Further, the magnitude or vectors of the fields and vibrations as detected by communication device 112 when it is located in driver seat 104 as shown in FIG. 1A, may be distinguished from the magnitude or vectors of the fields and vibrations detected by communication device 112 when it is located in passenger seat 106 as shown in FIG. 1B, which may additionally be distinguished from the magnitude or vectors of the fields and vibrations detected by communication device 112 when it is located in rear passenger seat 108 as shown in FIG. 1C.

The in-vehicle location determination discussed above with reference to FIG. 1A-C is but one example implementation in accordance with aspects of the present invention. Other non-liming example implementations include determining whether the communication device is located in specific locations, which will now be further described with reference to FIGS. 2-5.

Figure 2:
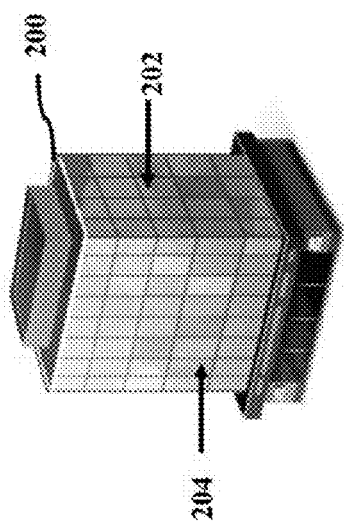
FIG. 2 illustrates a building.

FIG. 2 illustrates a building 200, which includes a computer server room 202 and a board room 204.

Figure 3:
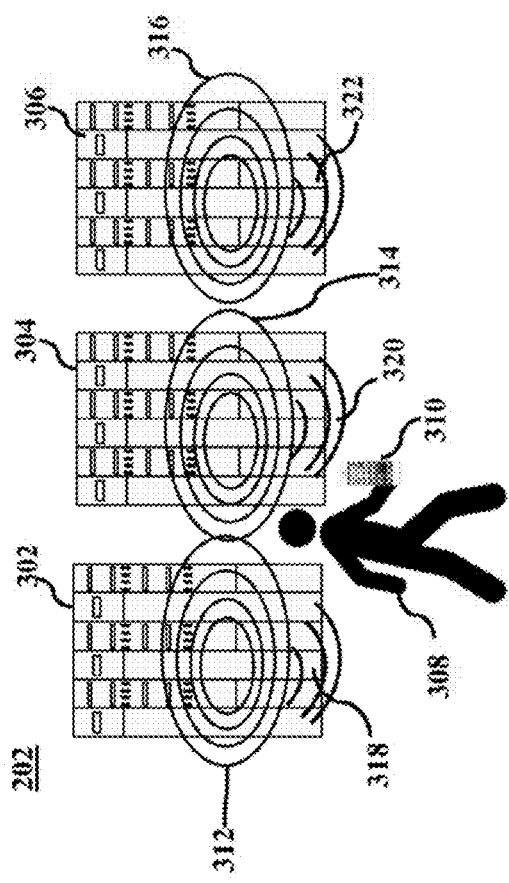
FIG. 3 illustrates a computer server room.

FIG. 3 is a view of computer server room 202, which includes server 302, server 304 and server 306. A person 308 in computer server room 202 is carrying a communication device 310, in accordance with aspects of the present invention. Server 302 generates magnetic fields 312, server 304 generates magnetic fields 314 and server 306 generates magnetic fields 316. Server 302 generates sound as represented by field lines 318, server 304 generate sound as represented by field lines 320 and server 306 sound as represented by field lines 322.

Figure 4:
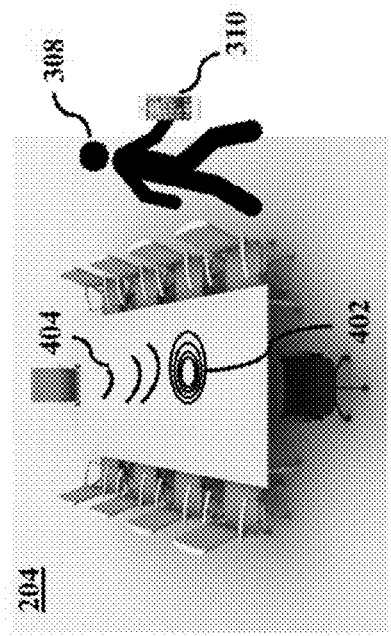
FIG. 4 is a view of board room.

FIG. 4 is a view of hoard room 204. Person 308 in hoard room 204 is carrying communication device 310. Much fewer electronic devices (not shown) in board room 204 generate magnetic fields 402. Further, sounds within board room 204 are much less, as compared to computer server room 202, as represented by field lines 404.

In this example embodiment, communication device 310 may detect the magnetic fields and the sounds to determine, that the location of person 308 within building 200. For example, the magnitude or vectors of the fields and sounds as detected by communication device 310 when it is located computer server room 202 may be compared with similar fields and sounds associated with computer server room 202. Such a similarity in detected parameters may enable communication device 310 to determine that it is located in computer server room 202.

Further, the magnitude or vectors a the fields and sounds as detected by communication device 310 When it is located in computer server room 202 as shown in FIG. 3, may be distinguished from the magnitude or vectors of the fields and sounds detected by communication device 310 when it is located in board room 204 as shown in FIG. 4.

Figure 5:
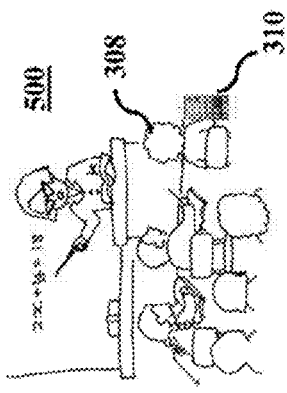
FIG. 5 illustrates a classroom.

As shown in FIG. 5, a classroom 500 includes person 308 having communication device 310.

The above discussed example locations are non-limiting, wherein aspects of the invention may be employed to modify operation of a communication in any predetermined location.

A more detailed discussion of example working embodiment will now be discussed with additional reference to FIGS. 6-11.

Figure 6:
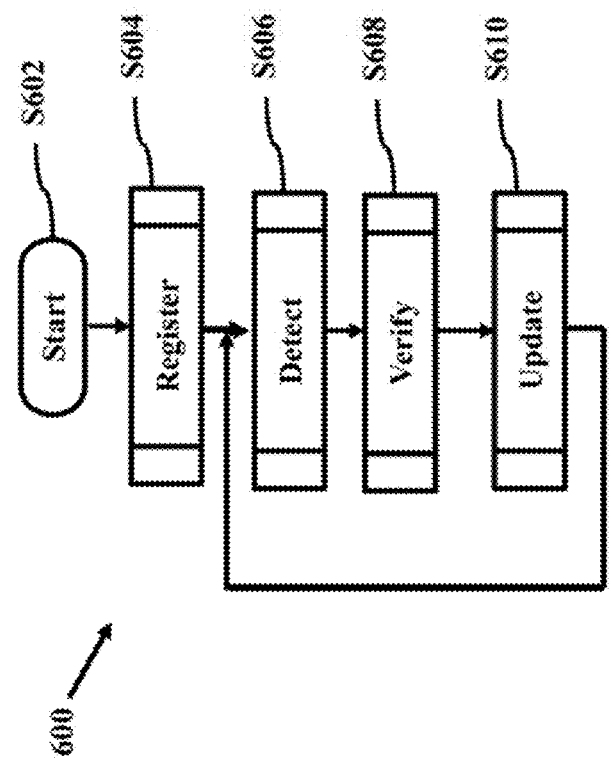
FIG. 6 illustrates an example method of modifying operation of a communication device in accordance with aspects of the present invention.

FIG. 6 illustrates an example method 600 of modifying operation of a communication device in accordance with aspects of the present invention.

Method 600 starts (S602) and a location, a mode and an action are registered (S604).

As for registration of a location, for example, returning to FIG. 1A, if a person would like to be able to identify the position of driver seat 104 within vehicle 102, the position of driver seat 104 would be registered based on detectable parameters associated with driver seat 104. Similarly, returning to FIG. 1B, if a person would like to be able to identify the position of passenger seat 106 within vehicle 102, the position of passenger seat 106 would be registered based on detectable parameters associated with passenger seat 106. In another example, returning to FIGS. 2-3, if a person would like to be able to identify the location of computer server room 202 within building 200, the location of computer server room 202 would be registered based on detectable parameters associated with computer server room 202. Similarly, returning to FIGS. 2 and 4, if a person would like to be able to identify location of board room 204 within building 202, the location of board room 204 would be registered based on detectable parameters associated with board room 202. Similarly, returning to FIGS. 2 and 5, if a person would like to be able to identify location of classroom 500, the location of classroom 500 would be registered based on detectable parameters associated with classroom 500.

As for registration of a mode, for example, returning to FIG. 1A, a user may register a vehicle mode associated with the registered location of driver seat 104. In another example, returning to FIGS. 2-3, a user may register a computer server room mode associated with the registered location of computer server room 202. In another example, returning to FIGS. 2 and 4, a user may register a board room mode associated with the registered location of board room 204. In another example, returning to FIGS. 2 and 5, a user may register a classroom mode associated with the registered location of classroom 500.

As for registration of an action, for example, returning to FIG. 1A, a user may register the act of texting, or the act of talking.

A more detailed discussion of registration of a location, a mode and an action will now be provided with additional reference to FIGS. 7-10.

Figure 7:
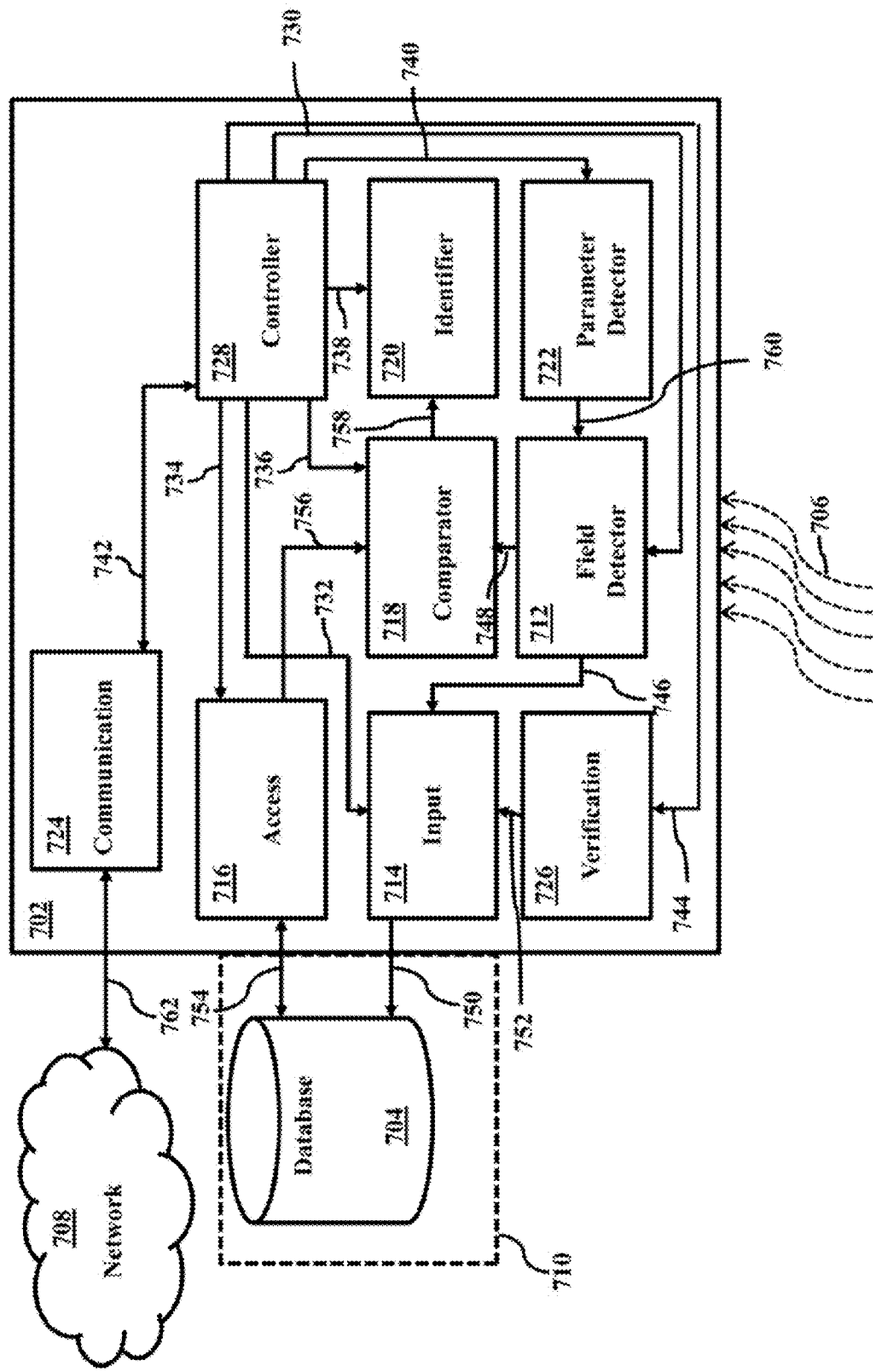
FIG. 7 illustrates an example device in accordance with aspects of the present invention.

FIG. 7 illustrates an example device 702 in accordance with aspects of the present invention.

FIG. 7 includes a device 702, a database 704, a field 706 and a network 708. In this example embodiment, device 702 and database 704 are distinct elements. However, in some embodiments, device 702 and database 704 may be a unitary device as indicated by dotted line 710.

Device 702 includes a field-detecting component 712, an input component 714, an accessing component 716, a comparing component 718, an identifying component 720, a parameter-detecting component 722, a communication component 724, a verification component 726 and a controlling component 728.

In this example, field-detecting component 712, input component 714, accessing component 716, comparing component 718, identifying component 720, parameter-detecting component 722, communication component 724, verification component 726 and controlling component 728 are illustrated as individual devices. However, in some embodiments, at least two of field-detecting component 712, input component 714, accessing component 716, comparing component 718, identifying component 720, parameter-detecting component 722, communication component 724, verification component 726 and controlling component 728 may be combined as a unitary device. Further, in some embodiments, at least one of field-detecting component 712, input component 714, accessing component 716, comparing component 718, identifying component 720, parameter-detecting component 722, communication component 724, verification component 726 and controlling component 728 may be implemented as a computer having tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Controlling component 728 is arranged to communicate with: field-detecting component 712 via a communication line 730; input component 714 via a communication line 732; accessing component 716 via a communication line 734; comparing component 718 is a communication line 736; identifying component 720 via a communication line 738; parameter-detecting component 722 via a communication line 740; communication component 724 via a communication line 742; and verification component 726 via a communication line 744. Controlling component 728 is operable to control each of field-detecting component 712, input component 714, accessing component 716, comparing component 718, identifying component 720, parameter-detecting component 722, communication component 724 and verification component 726.

Field-detecting component 712 is additionally arranged to detect field 706, to communicate with input component 714 via a communication line 746, to communicate with comparing component 718 via a communication line 748 and to communicate with parameter-detecting component 722 via a communication line 745. Field-detecting component 712 may be any known device or system that is operable to detect a field, non-limiting examples of which include an electric field, a magnetic field, and electro-magnetic field and combinations thereof. In some non-limiting example embodiments, field-detecting component 712 may detect the amplitude of a field at an instant of time. In some non-limiting example embodiments, field-detecting component 712 may detect a field vector at an instant of time. In some non-limiting example embodiments, field-detecting component 712 may detect the amplitude of a field as a function over a period of time. In some non-limiting example embodiments, field-detecting component 712 may detect a field vector as a function over a period of time. In some non-limiting example embodiments, field-detecting component 712 may detect a change in the amplitude of a field as a function over a period of time. In some non-limiting example embodiments, field-detecting component 712 may detect a change in a field vector as a function over a period of time. Field-detecting component 712 may output a signal based on the detected field.

Input component 714 is additionally arranged to communicate with database 704 via a communication line 750 and to communicate with verification component 726 via a communication line 752. Input component 714 may be any known device or system that is operable to input data into database 704. Non-limiting examples of input component 714 include a graphic user interface (GUI) having a user interactive touch screen or keypad.

Accessing component 716 is additionally arranged to communicate with database 704 via a communication line 754 and to communicate with comparing component 718 via a communication line 756. Accessing component 716 may be any known device or system that access data from database 704.

Comparing component 718 is additionally arranged to communicate with identifying component 720 via a communication line 758. Comparing component 718 may be any known device or system that is operable to compare two inputs.

Parameter-detecting component 722 is additionally arranged to communicate with identifying component 722 via a communication line 760. Parameter-detecting component 722 may be any known device or system that is operable to detect a parameter, non-limiting examples of which include velocity, acceleration, angular velocity, angular acceleration, geodetic position, light, sound, temperature, vibrations, pressure, biometrics, contents of surrounding atmosphere and combinations thereof. In some non-limiting example embodiments, parameter-detecting component 722 may detect the amplitude of a parameter at an instant of time. In some non-limiting example embodiments, parameter-detecting component 722 may detect a parameter vector at an instant of time. In some non-limiting example embodiments, parameter-detecting component 722 may detect the amplitude of a parameter as a function over a period of time. In some non-limiting, example embodiments, parameter-detecting component 722 may detect a parameter vector as a function over a period of time. In some non-limiting example embodiments, parameter-detecting component 722 may detect a change in the amplitude of a parameter as a function over a period of time. In some non-limiting example embodiments, parameter-detecting component 722 may detect a change in a parameter vector as a function over a period of time.

Communication component 724 is additionally arranged to communicate with network 708 via a communication line 762. Communication component 724 may be any known device or system that is operable to communicate with network 708. Non-limiting examples of communication component include a wired and a wireless transmitter/receiver.

Verification component 726 may be any known device or system that is operable to provide a request for verification. Non-limiting examples of verification component 726 include a graphic user interface having a user interactive touch screen or keypad.

Communication lines 730, 732, 734, 736, 738, 740, 742, 744, 745, 746, 748, 750, 752, 754, 756, 758, 760 and 762 may be any known wired or wireless communication line.

Database 704 may be any known device or system that is operable to receive, store, organize and provide (upon a request) data, wherein the "database" refers to the data itself and supporting data structures. Non-limiting examples of database 704 include a memory hard-drive and a semiconductor memory.

Network 708 may be any known linkage of two or more communication devices. Non-limiting examples of database 708 include a wide-area network, a local-area network and the Internet.

In accordance with aspects of the present invention, operation of device 702 is modified, when it is in a predetermined location and when it is in a predetermined mode. For example, when device 702 is located near the driver's seat of the vehicle and device 702 is in a vehicle mode, the operation of device 702 may be modified. Similarly, when device 702 is located in a school and device 702 is in a school mode, the operation of device 702 may be modified. In this light, device 702 recognizes when it is in a predetermined location and when it is in a predetermined mode. These aspects will be further described with additional reference to FIGS. 8-10.

For purposes of discussion, consider the following example where a person is registering texting on device 702, while device 702 is the position of driver seat 104 within vehicle 102 and while device 702 is in a vehicle mode.

Figure 8:
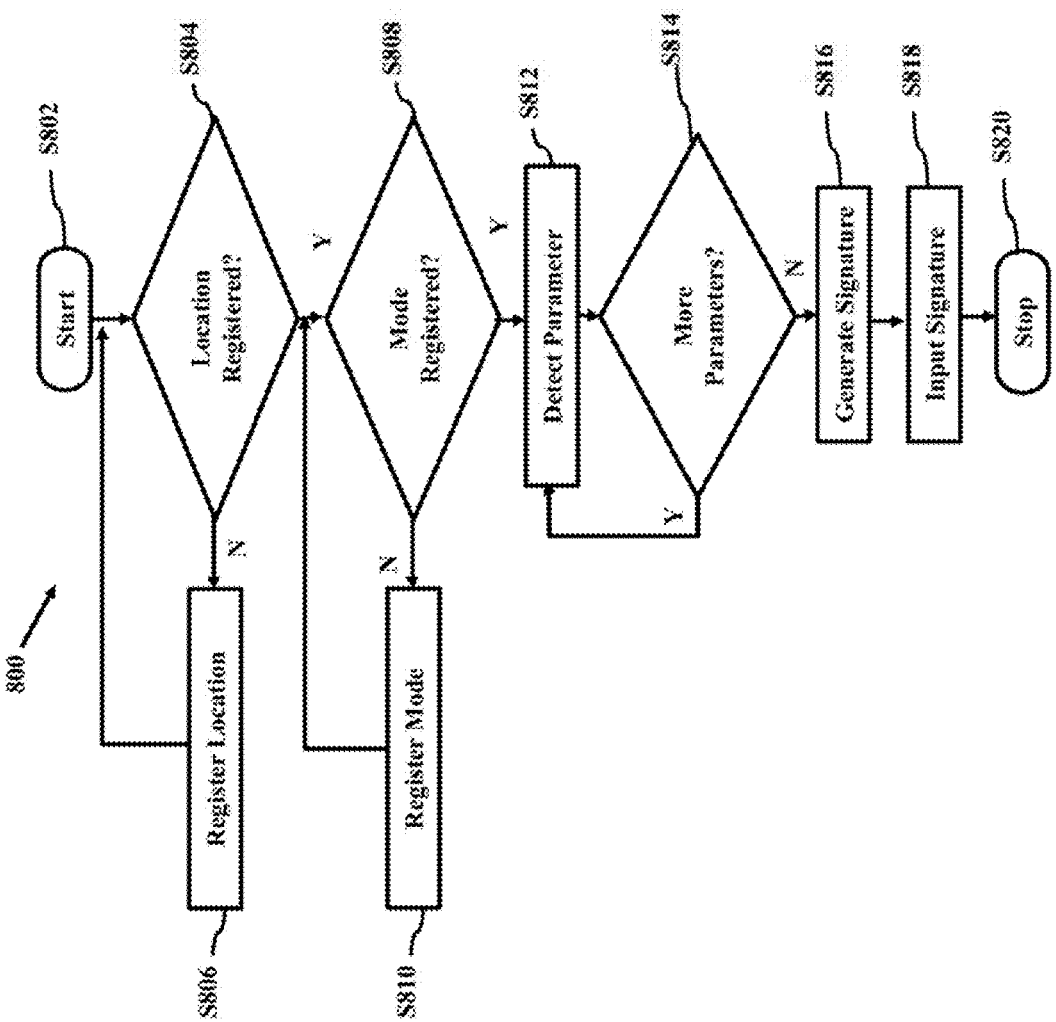
FIG. 8 illustrates an example method of registering an action in accordance with aspects of the present invention.

FIG. 8 illustrates an example method 800 of registering an action in accordance with aspects of the present invention.

As shown in the figure, method 800 starts (S802) and it is determined whether the current location is registered (S804). For example, detected parameters of the current location may be used to generate a location signature associated with the current location. This type of location signature generation may be performed by any known method, a non-limiting example of which is disclosed in U.S. patent application Ser. No. 14/072,231. As shown in FIG. 7, the location signature for the current location may be stored in database 704. Database 704 may have a plurality of location signatures for a plurality of locations, each of which may have been supplied to database 704 as a priori information.

Returning to FIG. 8, if it is determined that the current location is not registered (N at S804), then the location is registered (S806). For example, returning to FIG. 7, controlling component 728 may register the current location.

Figure 9:
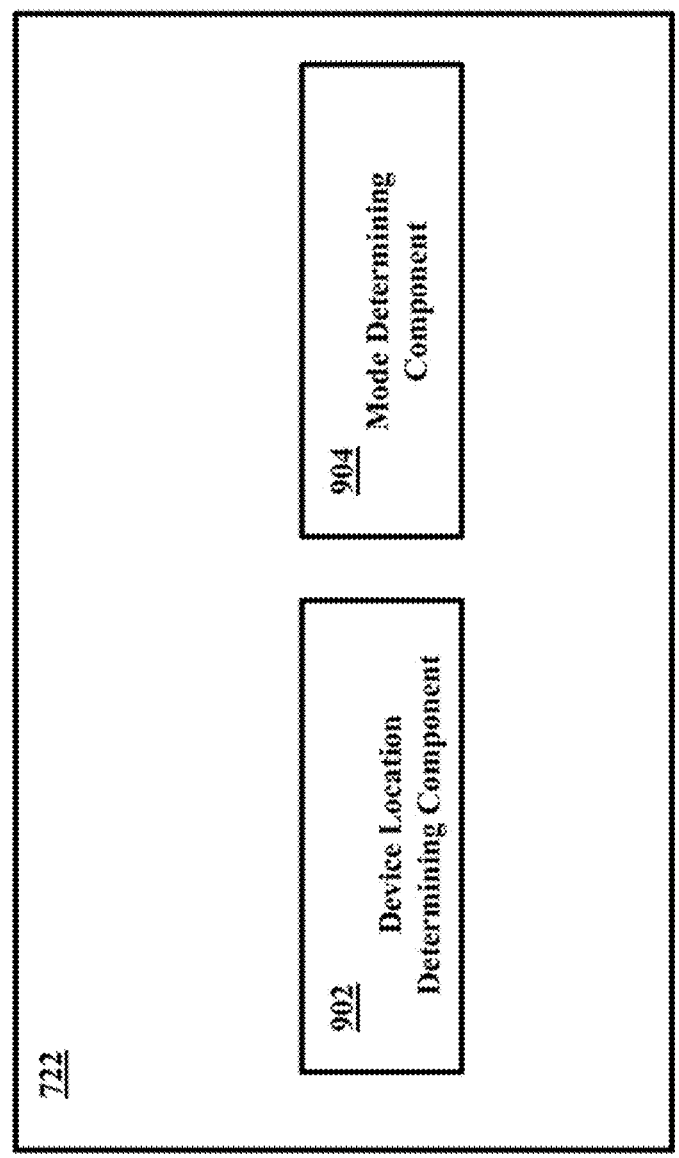
FIG. 9 illustrates an example controlling component of the device of FIG. 7.

FIG. 9 illustrates an example controlling component 728.

As shown in the figure, controlling component 728 includes a device location determining component 902 and a mode determining component 904.

In this example, device location determining component 902 and mode determining component 904 are illustrated as individual devices. However, in some embodiments, device location determining component 902 and mode determining component 904 may be combined as a unitary device. Further, in some embodiments, at least one of device location determining component 902 and mode determining component 904 may be implemented as a computer having tangible computer-readable media for carrying or having computer-executable instructions or data structures stored thereon.

Device location determining component 902 may be any device or system that is able to determine whether device 702 is in a predetermined location. Mode determining component 904 may be any device or system that is able to determine whether device 702 is in a predetermined mode.

One non-limiting example of device location determining component 902 being able to register the current location includes the situation when a user instructs device 702 to register the current location by way of input component 714. For example, a user may activate an icon on the GUI to indicate that device 702 is now in a vehicle, board room, classroom, church, etc. Such activation of the GUI would inform device location determining component 902 that device 702 is in a predetermined location.

Another non-limiting example of device location determining component 902 being able to register the current location includes detecting a field by way of field-detecting component 712. For example, returning to FIG. 7, field-detecting component 712 detects field 706. For purposes of discussion, let field 706 be a magnetic field corresponding to the superposition of magnetic fields generated by all electronic and mechanical systems involved with the running vehicle, e.g., magnetic fields 114, 116 and 118 as shown in FIG. 1A. A detected field signature may be compared with a priori field signature by any known manner, a non-limiting example of which includes that as described, in U.S. patent application Ser. No. 14/072,231.

Another non-limiting example of device location determining component 902 being able to register the current location includes detecting other parameters by way of parameter-detecting component 722. These other detected parameters may be used to generate a location signature, which in turn will be compared with a priori location signatures by any known manner, a non-limiting example of which includes that as described in U.S. patent application Ser. No. 14/072,231.

In some embodiments, device 702 has a predetermined number of parameters to detect, wherein controlling component 728 may control such detections. For example, the first parameter to be detected may be a magnetic field associated with a running vehicle, wherein controlling component 728 may instruct field-detecting component 712 to detect a magnetic field. Further, a second parameter to be detected may be another known detected parameter additionally associated with the running vehicle, e.g., vibrations in the chassis, wherein controlling component 728 may instruct parameter-detecting component 722 to detect the second parameter. Further parameter-detecting component 722 may be able to detect many parameters.

For example, detected parameters of the current location may be used to generate a location signature associated with the current location. This type of location signature generation may be performed by any known method, a non-limiting example of which is disclosed in U.S. patent application Ser. No. 14/072,231, wherein device location determining component 902 may control field-detecting component 712, parameter-detecting component 722, comparing component 718 and input component 714 to generate and store a location signature of the current location into database 704.

At this point, in this example, the location of the driver's seat in the vehicle of the user of device 702 is registered. As such, device 702 will now automatically recognize when it is in the location of the driver's seat in the vehicle of the user of device 702. Clearly, this example is used for discussion and is non-limiting, wherein any location may be registered.

Returning to FIG. 8, now that the current location is registered (S806 then returns to S804), it is determined whether the current mode is registered (S808). For example, returning to FIG. 7, controlling component 728 may determine whether the current mode is registered. In some embodiments, device 702 may have specific preset modes, such as a vehicle mode, a sleep mode, a low power mode, a specific location mode, etc., wherein each mode is associated with a respective location.

In some embodiments, device 702 may have specific preset modes, such as a vehicle mode, a sleep mode, a low power mode, a specific location mode, etc.

Returning to FIG. 8, if it is determined that the current mode is not registered (N at S808), then the mode is registered (S810). For example, returning to FIG. 7, controlling component 728 may register the current mode. In some embodiments, device 702 may enable a user to establish modes, such as a vehicle mode, a sleep mode, a low power mode, a specific location mode, etc. In an example embodiment, the user may use the GUI to establish a mode by assigning a specific mode to the current location.

Once the operating mode of 702 is determined, controller 728 determines whether the detected mode coincides with the registered location. For example, a user would not want device 702 in a registered and detected location of a driver seat 104, as shown in FIG. 1, to operate in a classroom mode. Similarly, a user would not want device 702 in a registered and detected location of class room 500, as shown in FIG. 5, to operate in a vehicle mode. On the contrary, in accordance with aspects of the present invention, device 702 may modify its operation when device 702 is in a registered and detected location of a driver seat 104, as shown in FIG. 1, and it is operating in a registered and recognized vehicle mode. Similarly, in accordance with aspects of the present invention, device 702 may modify its operation when device 702 is in a registered and detected location of a class room 500, as shown in FIG. 5, and it is operating in a registered and recognized class room mode.

In this manner, in some embodiments, controller may instruct input component 714 to input the relationships between registered locations and registered modes into database 704. These relationships may be stored in any known method, a non-limiting example of which includes a lookup table. When the determined location corresponds to a previously registered location, and the determined location coincides with the determined mode, which corresponds to a previously registered mode, then the operation of device 702 may be modified.

Returning to FIG. 8, in this example embodiment, the mode is registered (S810) after the location is registered (S804). However, in some embodiments, the mode may be registered prior to the location being registered. Further, in some embodiments, the mode may be registered concurrently with the location being registered.

After the mode is registered (S810), in this example, a parameter is detected (S812) in order to register a signature for an action—an action signature. For example, returning to FIG. 7, let the parameter be orientation of device 702 when the user is texting, wherein parameter-detecting component 722 detects orientation of device 702. This is a non-limiting example, wherein the detected parameter may be any known detectable parameter, of which other non-limiting examples include electric fields, electro-magnetic fields, velocity, acceleration, angular velocity, angular acceleration, geodetic position, sound, temperature, an image, a Blue Tooth signal, a Wi-Fi signal, light, vibrations, pressure, biometrics, contents of surrounding atmosphere, a change in electric fields, a change in magnetic fields, a change in electro-magnetic fields, a change in velocity, a change in acceleration, a change in angular velocity, a change in angular acceleration, a change in geodetic position, a change in sound, a change in temperature, a chance in light, a change in vibrations, a change in pressure, a change in biometrics, a change in contents of surrounding atmosphere and combinations thereof.

Returning to FIG. 8, after the first parameter is detected (S812), it is determined whether another parameter is to be detected (S814). For example, returning to FIG. 7, controlling component 728 may instruct at least one of field-detecting component 712 and parameter-detecting component 722 to detect another parameter.

A magnetic field may be a relatively distinct parameter that may be used to determine whether device 702 is in a specific orientation. However, there may be situations that elicit a false positive. As such, in order to reduce the probability of a false positive indication that device 702 is in a specific orientation, a second parameter associated with the action may be used. Along this notion, it is an example aspect of the invention to detect a plurality of parameters associated with an action to increase the probability of a correct identification of the action.

In some embodiments, device 702 has a predetermined number of parameters to detect, wherein controlling component 728 may control such detections. For example, the first parameter to be detected (in S812) may be orientation, wherein controlling component 728 may instruct parameter-detecting component 722 to detect orientation. Further, a second parameter to be detected may be another known detected parameter additionally associated with texting, e.g., acceleration associated with button pushing, wherein controlling component 728 may instruct parameter-detecting component 722 to detect the second parameter. Further parameter-detecting component 722 may be able to detect many parameters. This will be described with greater detail with reference to FIG. 10.

Figure 10:
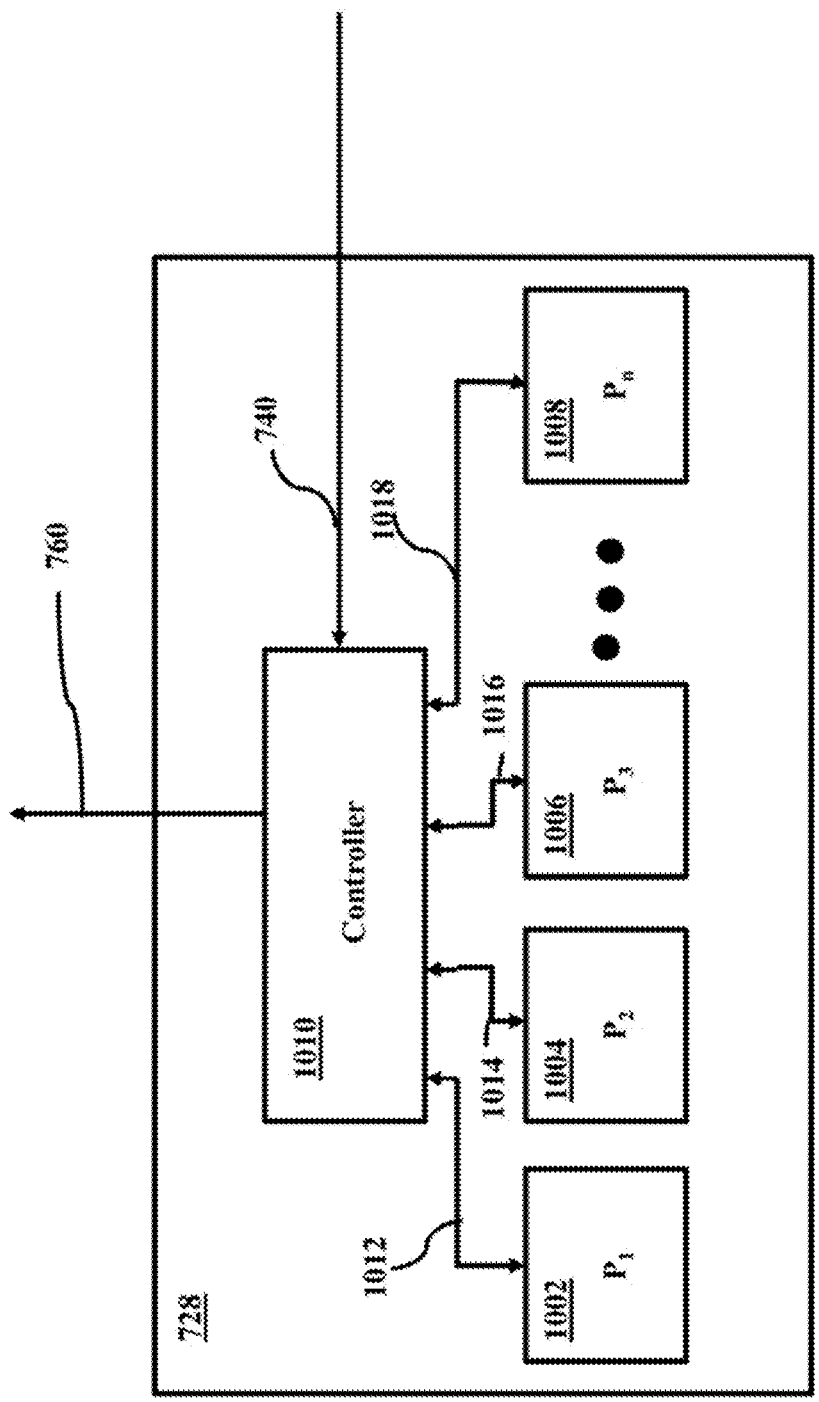
FIG. 10 illustrates an example parameter-detecting component of the device of FIG. 7.

FIG. 10 illustrates an example parameter-detecting component 722.

As shown in the figure, parameter-detecting component 722 includes a plurality of detecting components, a sample of which are indicated as a first detection component 1002, a second detecting component 1004, a third detecting component 1006 and an n-th detecting component 1008. Parameter-detecting component 722 additionally includes a controlling component 1010.

In this example, detecting component 1002, detecting component 1004, detecting component 1006, detecting component 1008 and controlling component 1010 are illustrated as individual devices. However, in some embodiments, at least two of detecting component 1002, detecting component 1004, detecting component 1006, detecting component 1008 and controlling component 1010 may be combined as a unitary device. Further, in some embodiments, at least one of detecting component 1002, detecting component 1004, detecting component 1006, detecting component 1008 and controlling component 1010 may be implemented as a computer having tangible computer-readable media for carrying or having computer-executable instructions or data structures stored thereon.

Controlling component 1010 is configured to communicate with: detecting component 1002 via a communication line 1012; detecting component 1004 via a communication line 1014; detecting component 1006 via a communication line 1016; and detecting component 1008 via a communication line 1018. Controlling component 1010 is operable to control each of detecting component 1002, detecting component 1004, detecting component 1006 and detecting component 1008. Controlling component 1010 is additionally configured to communicate with controlling component 728 of FIG. 7 via communication line 740 and to communicate with field-detecting component 712 of FIG. 7 via communication line 760.

The detecting components may each be a known detecting component that is able to detect a known parameter. For example each detecting component may be a known type of detector that is able to detect at least one of magnetic fields, electric fields, electro-magnetic fields, velocity, acceleration, angular velocity, angular acceleration, geodetic position, sound, temperature, an image, a Blue Tooth signal, a Wi-Fi signal, light, vibrations, pressure, biometrics, contents of surrounding atmosphere, a change in electric fields, a change in magnetic fields, a change in electro-magnetic fields, a change in velocity, a change in acceleration, a change in angular velocity, a change in angular acceleration, a change in geodetic position, a change in sound, a change in temperature, a change in light, a change in vibrations, a change in pressure, a change in biometrics, a change in contents of surrounding atmosphere and combinations thereof. For purposes of discussion, let: detecting component 1002 be able to detect sound; detecting component 1004 be able to detect velocity in three dimensions; detecting component 1006 be able to detect vibrations; and detecting component 1008 be able to detect geodetic position.

In some non-limiting example embodiments, at least one of the detecting components of parameter-detecting component 722 may detect a respective parameter as an amplitude at an instant of time. In some non-limiting example embodiments, at least one of the detecting components of parameter-detecting component 722 may detect a respective parameter as a function over a period of time.

Each of the detecting components of parameter-detecting component 722 is able to generate a respective detected signal based on the detected parameter. Each of these detected signals may be provided to controlling component 1010 via a respective communication line.

Controlling component 1010 is able to be controlled by controlling component 728 via communication line 740.

Returning to FIG. 8, if another parameter is to be detected (Y at S814), then another parameter will be detected (S812). For example, as shown in FIG. 7, controlling component 728 may then instruct parameter-detecting component 722 to detect another parameter via communication line 740. For purposes of discussion, let the second parameter to be detected be acceleration. As such, at this point, as shown in FIG. 10, controlling component 1010 instructs detecting component 1002, via communication line 1012, to detect acceleration. Detecting component 1002 provides a signal corresponding to the detected acceleration to controlling component 1010 via communication line 1012.

This process will repeat until all the parameters to be detected are detected. In some embodiments, this process will repeat a predetermined number of times in order to detect predetermined types of parameters. In some embodiments, this process is only repeated until enough parameters are detected in order reach as predetermined probability threshold, which will reduce the probability of a false positive action identification.

Retuning to FIG. 10, as just discussed, controlling component 1010 is able to send individual detected signals from each detecting component. In other example embodiments, controlling component 1010 is able to receive and hold the individual detected signals from each detecting component, wherein controlling component 1010 is able to generate a composite detected signal that is based on the individual detected signals. The composite detected signal may be based on any of the individual detected signal, and combinations thereof. In some embodiments, controlling component 1010 may additionally process any of the individual detected signals and combinations thereof to generate the composite detected signal. Non-limiting examples of further processes include averaging, adding, subtracting, and transforming any of the individual detected signals and combinations thereof.

It should be further noted that in some embodiments, all parameters that are to he detected are detected simultaneously. In such a case, for example, as shown in FIG. 7, controlling component 728 may then instruct parameter-detecting component 722 to detect all parameters via communication line 740. As such, at this point, as shown in FIG. 10, controlling component 1010 instructs all the detecting components to detect their respective parameters. All the detecting components then provide a respective signal corresponding to the respective detected parameter to controlling component 1010 via communication line 1014. In this example, controlling component 1010 may then provide the detected signal to field-detecting component 712 via communication line 760 as shown in FIG. 7.

Returning to FIG. 8, if no more parameters are to be detected (N at S814), then an action signature is generated (S816), For example as shown in FIG. 7, parameter-detecting component 722 may generate an action signature of the action based on the detected parameter.

Returning to FIG. 8, once the action signature is generated (S816), the action signature in input into memory (S818). For example, as shown in FIG, 7, field-detecting component 712 provides the signature to input component 714 via communication line 746.

In an example embodiment, input component 714 includes a GUI that informs a user of device 702 that an action signature has been generated. Input component 714 may additionally enable the user to input an association between the registered location, the registered mode and the generated action signature. For example, input component 714 may display on a GUI a message such as "A signature was generated. To what action is the signature associated?" Input component 714 may then display an input prompt for the user to input, via the GUI, an action to be associated with the generated action signature.

Input component 714 may then provide the action signature, and the association to a specific location and mode, to database 704 via communication line 750.

As discussed above, in some embodiments, database 704 is part of device 702, whereas in other embodiments, database 704 is separate from device 702. Data input and retrieval from database 704 may be faster when database 704 part of device 702, as opposed to cases where database 704 is distinct from device 702. However, size may be a concern when designing device 702, particularly when device 702 is intended to be a handheld device such as a smartphone. As such, device 702 may be much smaller when database 704 is distinct from device 702, as opposed to cases where database 704 is part of device 702.

Consider an example embodiment, where database 704 is pan of device 702. In such cases, input component 714 may enable a user to input action signatures and the location/mode associations, for a predetermined number of actions. In this manner, database 704 will only be used for device 702.

Now consider an example embodiment, where database 704 is separate from device 702. Further, let database 704 be much larger than the case where database 704 is part of device 702. Still further, let database 704 be accessible to other devices in accordance with aspects of the present invention. In such cases, input component 714 may enable a user to input action signatures and the location/mode associations, for a much larger predetermined number of actions. Further, in such cases, input component 714 may enable other users of similar devices to input action signatures and the location/mode associations, for even more actions.

It should be noted that although the above-discussed example includes identifying texting as an action, this is a non-limiting example. Aspects of the invention may additionally be used to identify any action that has detectable parameters.

At this point, method 800 stops (S820).

A location, a mode of operation at the registered location, and an action have been registered. In accordance with aspects of the present invention, device 702 will be able to subsequently automatically determine when it is in the registered mode at the registered location. When device 702 automatically determines such situations, device 702 will automatically modify its operation based on a detected action.

With a prior art system or method, a user may have to actuate a device to modify its operation when the user determines that be is in particular location and the phone is operating in particular mode. On the contrary, in accordance with aspects of the present invention, device 702 will automatically modify its operation without any user involvement.

Returning to FIG. 6, now that a location, a mode and an action have been registered (S604), an action may be detected (S606). In other words, now that a location has been registered, and now that a mode of operation of device 702, at the location, has been registered, device 702 will detect whether it is in the registered location while operating in the registered mode and a predetermined action is detected. This will further described with additional reference to FIG. 11.

Figure 11:
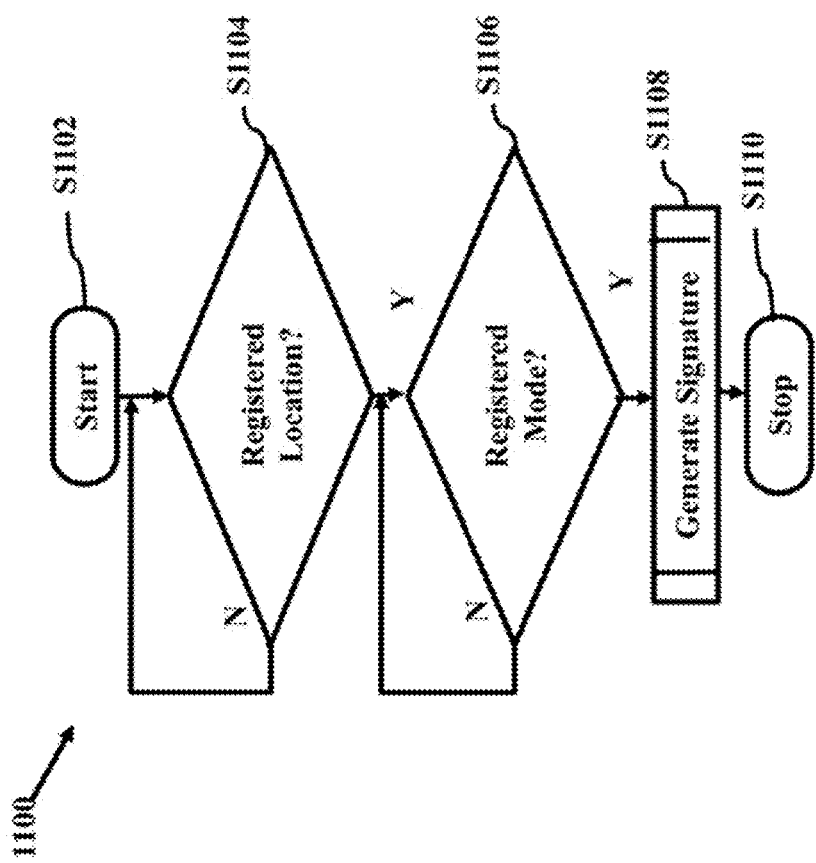
FIG. 11 illustrates a method for detecting an action when in a registered location while operating in a registered mode in accordance with aspects of the present invention.

FIG. 11 illustrates a method 1100 for detecting an action when in a registered location while operating in a registered mode.

As shown in the figure, method 1100 starts (S1102) and it is determined whether the current location is a registered location (S1104). The current location may be detected by any known system or method. In an example embodiment, the location is detected in a manner as disclosed in U.S. patent application Ser. No. 14/105,934.

For example, returning to FIG. 7, a plurality of parameters may be detected via field-detecting component 712 and parameter-detecting component 722. The detected parameters may be used to generate a location signature of the current location. The generated location signature is then compared with previously stored location signatures associated with previously registered locations, as stored in database 704. When the generated location signature coincides with a previously stored location signature associated with previously registered location, identifying portion 720 identifies the current location as one of the previously registered locations.

If device 702 is not in a registered location (N at S1104), then method 1100 continues until it is determined tint device 702 is in a registered location (Y at S1104).

Returning to FIG. 11, after determining that the current location is a registered location (Y at S1104), it is determined whether the current mode of operation is a registered mode corresponding to the registered location (S1106). The current mode may be detected in a manner similar to that discussed above with reference to FIG. 8 (S808). In particular, for example, returning to FIG. 7, controlling component 728 may determine whether the current mode is registered. In some embodiments, device 702 may have specific preset modes, such as a vehicle mode, a sleep mode, a low power mode, a specific location mode, etc.

If device 702 is not in a registered mode corresponding to the registered location (N at S1106), then method 1100 continues until it is determined that device 702 is in the corresponding registered mode (Y at S1104).

After determining that the current mode is the corresponding registered mode (Y at S1106), a new signature is generated (S1108). Consider, for example, the situation where device 702 is located near driver seat 104 and is operating in a vehicle mode, which in this example is associated with the location of driver seat 104. In accordance with aspects of the present invention, device 702 may detect parameters associated with previously registered actions. These detected parameters are used to generate new action signatures.

For example, the orientation of device 702 may be detected in conjunction with acceleration associated with pushing button on the GUI, this indicating texting. In another example, a speaker may be detected as being activated by analyzing acceleration patterns detected by the accelerometer in the phone. More particularly, using the phone speaker causes a recognizable acceleration pattern typical to such use and by comparing real time accelerometer data to a single or multiple prerecorded action signatures.

In another non-limiting example embodiment, when device 702 is located near driver seat 104 and is operating in a vehicle mode, device 702 may determine whether the driver is holding the phone up to her ear, thus suggesting that the user is talking while driving. More specifically, a gyroscope within device 702 may be used to identify the orientation of the phone that is unique to a user holding the phone next to her ear.

In another non-limiting example embodiment, when device 702 is located near driver seat 104 and is operating in a vehicle mode, device 702 may monitor light, or a change in light, via a light sensor on device 702 to identify when a user holding the phone next to her ear. If device 702 is positioned proximate a user's head, then the light sensor will read diminished levels of light present.

In another non-limiting example embodiment, when device 702 is located near driver seat 104 and is operating in a vehicle mode, device 702 may detect acceleration. For example, the act of raising device 702 from, for example, the console in a vehicle to the ear will present specific characteristics which may be detected by an accelerometer within device 702.

By analyzing at least one detected parameter associated with device 702, it may he determined whether or not device 702 performing an action.

When device 702 is in a registered location and is operating in a registered mode corresponding to the registered location and a specific action is detected, the mode of operation of device 702 may be modified. For example, once it is detected that device 702 is device 702 is located near driver seat 104 and is operating in a vehicle mode and parameters are detected which correspond to talking on device 702, device 702 may modify its operation. Non-limiting examples of such modification include preventing the user from talking on device 702 or transmitting an indicator that a user is talking on device 702 while driving.

This aspect of the present invention will be further described with reference to FIG. 12.

Figure 12:
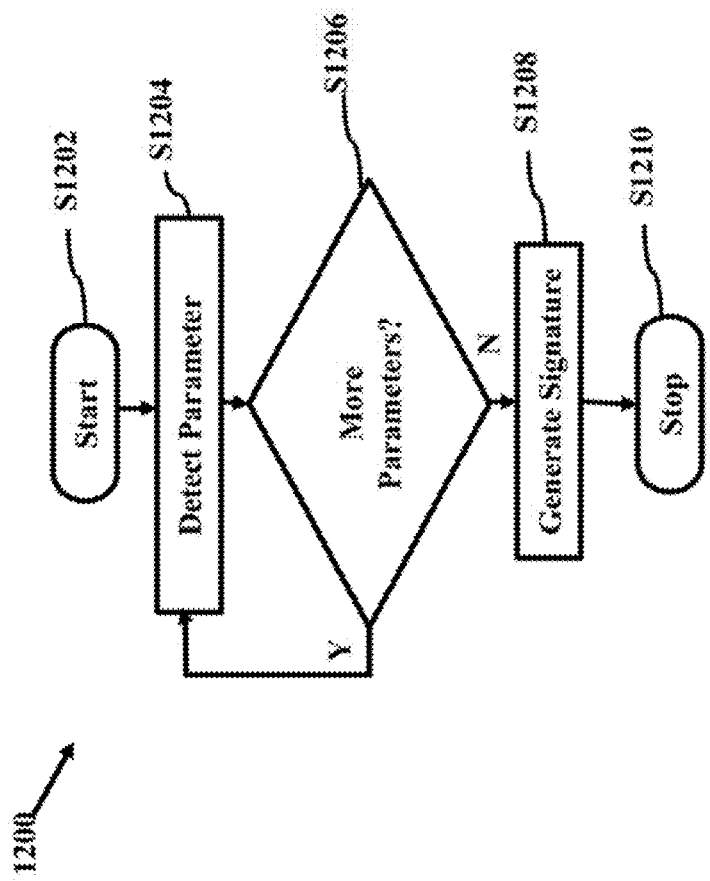
FIG. 12 illustrates an example method 1200 of modifying operation of a device in accordance with aspects of the present invention.

FIG. 12 illustrates an example method 1200 of generating an action signature in accordance with aspects of the present invention.

As shown in the figure, method 1200 starts (S1202) and a parameter is detected (S1204). A parameter may be detected by any known method or system. In an example embodiment, a parameter is detected in a manner similar to that discussed above with reference to method 800, e.g., S812. Non-limiting examples of detected parameters include at least one of magnetic fields, electric fields, electro-magnetic fields, velocity, acceleration, angular velocity, angular acceleration, geodetic position, sound, temperature, an image, a Blue Tooth signal, a Wi-Fi signal, light, vibrations, pressure, biometrics, contents of surrounding atmosphere, a change in electric fields, a change in magnetic fields, a change in electro-magnetic fields, a change in velocity, a change in acceleration, a change in angular velocity, a change in angular acceleration, a change in geodetic position, a change in sound, a change in temperature, a change in light, a change in vibrations, a change in pressure, a change in biometrics, a change in contents of surrounding atmosphere and combinations thereof.

Returning to FIG. 12, after the parameter has been detected (S1204), it is determined whether more parameters are to be detected (S1206). The additional parameters may be detected by any known method or system. In an example embodiment, additional parameters may be detected in a manner similar to that discussed above with reference to method 800, e.g., S814.

Returning to FIG. 12, if another parameter is to be detected (Y at S1206), then another parameter will be detected (S1204). This process will repeat until all the parameters to be detected are detected. In some embodiments, this process will repeat a predetermined number of times in order to detect predetermined types of parameters. In some embodiments, this process is only repeated until enough parameters are detected in order reach a predetermined, probability threshold, which will reduce the probability of a false positive action determination.

An action signature is then generated (S1208). The action signature may be generated by any known method or system. In an example embodiment, a signature is generated a manner similar to that discussed above with reference to method 800, e.g., S816.

Returning to FIG. 12, after the action signature is generated (S1208), it is then inputted (S1210). As shown in FIG. 7, this second signature is provided to comparing component 718.

Method 1200 then stops (S1210). Returning to FIG. 11, method 1100 additionally stops (S1110)

Returning to FIG. 6, after the action has been detected (S606), it is verified (S608). For example, a device in accordance with aspects of the present invention would determine whether the newly detected action is the action that was previously registered. A more detailed discussion of registration will now be provided with additional reference to FIG. 13.

Figure 13:
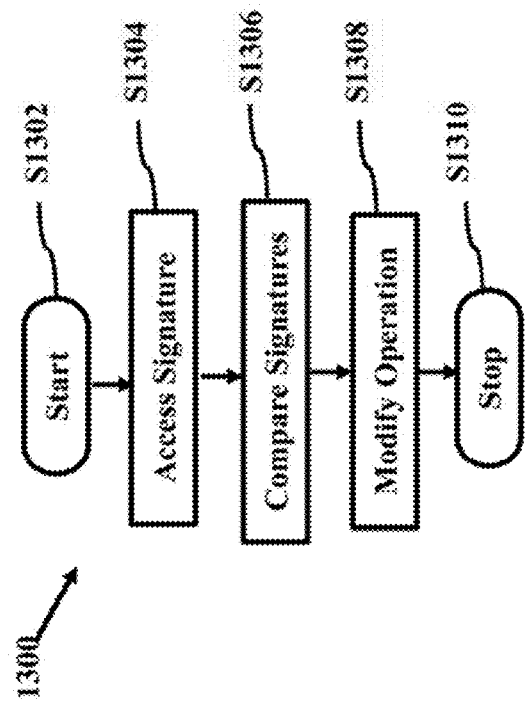
FIG. 13 illustrates an example method of verifying an action in accordance with aspects of the present invention.

FIG. 13 illustrates an example method 1300 of verifying an action in accordance with aspects of the present invention.

Method 1300 starts (S1302) and the previously stored action signature is accessed (S1304). For example, as shown in FIG. 7, access component 716 retrieves the previously-stored action signature from database 704 via communication line 754. Access component 716 then provides the retrieved, previously-stored action signature to comparator 718 via communication line 756.

Returning to FIG. 10, now that the previously stored action signature has been accessed (S1304), the action signatures are compared (S1306). For example, as shown in FIG. 7, comparator 718 compares the retrieved, previously stored action signature as provided by access component 716 with the newly generated action signature as provided by field-detecting component 712.

Returning to FIG. 13, now that the action signatures have been compared (S1306), the action may be identified (S1308). For example, as shown in FIG. 7, comparator 718 provides an output to identifying component 720 via communication line 758. If the retrieved, previously stored action signature as provided by access component 716 matches the newly generated action signature as provided by field-detecting component 712, then the newly detected action is the same action that was previously registered. In such a case, identifying component 720 may indicate that the newly detected action is the same action that was previously registered. If the retrieved, previously stored action signature as provided by access component 716 does not match the newly generated action signature as provided by field-detecting component 712, then the newly detected action is not the same action that was previously registered. In such a case, identifying component 720 may indicate that the newly detected action is not the same action that was previously registered.

At this point, method 1300 stops (S1310).

Returning to FIG. 6, after the action has been verified, the data is updated (S610). For example, in some embodiments, as shown in FIG. 7, comparator 718 may determine that the previously stored action signature as provided by access component 716 does not exactly match the newly generated action signature as provided by field-detecting component 712, but the difference between the previously stored action signature as provided by access component 716 does not exactly match the newly generated action signature as provided by field-detecting component 712 is within a predetermined acceptable limit. In such cases, identifying component 720 may indicate that the newly detected action is still the same action that was previously registered. Further, comparator 718 may provide the newly generated action signature as provided by field-detecting component 712 to access component 716 via communication line 756. Access component 716 may then provide the newly generated action signature to database 704 via communication line 754.

In this manner, database 704 may be "taught" to accept variations of previously registered action signatures. In some embodiments, an average of recognized action signatures may be stored for future use. In some embodiments, a plurality of each recognized action signature may be stored for future use.

Returning to FIG. 6, after updating (S610) device 702 waits to detect a new action (S606) and method 600 continues.

The example embodiments discussed above are drawn to identifying, via a communication device, a specific location using fields and other parameters associated therewith. Once identified, other functions of the communication device may be available. For example, consider the situation wherein a communication device in accordance with aspects of the present invention is embodied in a smartphone. In such an example, once a location (e.g., a position within a vehicle or a specific room within a building) is identified, the smartphone may institute a suite of applications and turn off other applications. In a specific example embodiment, the identification of a vehicle may be used to place a smartphone in a "Vehicle Mode," wherein the smartphone will operate in a particular manner because it is determined to be in a vehicle.

In accordance with aspects of the present invention discussed above, the sensors and functionalities of communication devices can be used to automate modification of modes of operation. Modification of modes of operation may take the form of at least one of enabling predetermined functions, disabling predetermined functions and altering predetermined functions.

In the drawings and specification, there have been disclosed embodiments of the invention and, although specific terms are employed, they are used in a generic and descriptive sense only and not for purposes of limitation, the scope of the invention being set forth in the following claims.

What is claimed as new and desired to be protected by Letters Patent of the United States is:

1. A device, for use with a database having stored therein, a plurality of signatures corresponding to a plurality of actions, respectively, said device, comprising:

a mode determining component operable to determine whether the device is in a predetermined mode;

a device location determining component operable to determine whether the device is located in a predetermined location;

a parameter detecting component operable to detect a predetermined parameter and to generate an action signature based on the detected predetermined parameter;

an accessing component operable to access one of the plurality of signatures from the database;

a comparing component operable to generate a comparison signal based on a comparison of the action signature and the one of the plurality of signatures; and a mode controlling component operable to modify operation of the device based on the comparison signal when said mode determining component determines that the device is operating in the predetermined mode and when said location determining component determines that the device is located in the predetermined location.

2. The device of claim 1, further comprising:

a texting component operable to enable a user to perform at least one of creating an outgoing text and accessing a received text, wherein said parameter detecting component is operable to detect, as the predetermined parameter, the user performing at least one of creating the outgoing text and accessing the received text via said texting component.

3. The device of claim 2, wherein said parameter detecting component comprises a detecting component operable to detect at least one of magnetic fields, electric fields, electromagnetic fields, velocity, acceleration, angular velocity, angular acceleration, geodetic position, sound, temperature, an image, a Blue Tooth signal, a Wi-Fi signal, light, vibrations, pressure, biometrics, contents of surrounding atmosphere, a change in electric fields, a change in magnetic fields, a change in electro-magnetic fields, a change in velocity, a change in acceleration, a change in angular velocity, a change in angular acceleration, a change in geodetic position, a change in sound, a change in temperature, a change in light, a change in vibrations, a change in pressure, a change in biometrics, a change in contents of surrounding atmosphere and combinations thereof.

4. The device of claim 3, further comprising:

a microphone component, wherein said parameter detecting component is operable to detect, as the predetermined parameter, the user speaking via the microphone.

5. The device of claim 1, wherein said parameter detecting component is further operable to provide the action signature to the database.

6. The device of claim 1, wherein said parameter detecting component operable to detect a second predetermined parameter and to generate the action signature based on the detected predetermined parameter and the detected second predetermined parameter.

7. The device of claim 1, further comprising:

a microphone component, wherein said parameter detecting component is operable to detect, as the predetermined parameter, the user speaking via the microphone.

8. A method of using a database having stored therein, a plurality of signatures corresponding to a plurality of actions, respectively, said method comprising:

determining, via a mode determining component, whether the device is in a predetermined mode;

determining, via a device location determining component, whether the device is located in a predetermined location;

detecting, via a parameter detecting component, a predetermined parameter;

generating, via the parameter detecting component, a action signature based on the detected predetermined parameter;

accessing, via an accessing component, one of the plurality of signatures from the database;

generating, via a comparing component, a comparison signal based on a comparison of the action signature and one of the plurality of signatures; and modifying, via a mode controlling component, operation of the device based on the comparison signal when the mode determining component determines that the device is operating in the predetermined mode and when the location determining component determines that the device is located in the predetermined location.

9. The method of claim 8, further comprising:

enabling, via a texting component, a user to perform at least one of creating an outgoing text and accessing a received text, wherein said detecting, via a parameter detecting component, a predetermined parameter comprises detecting, as the predetermined parameter, the user performing at least one of creating the outgoing text and accessing the received text via the texting component.

10. The method of claim 9, wherein said detecting, as the predetermined parameter, the user performing at least one of creating the outgoing text and accessing the received text via the texting component comprises detecting at least one of magnetic fields, electric fields, electromagnetic fields, velocity, acceleration, angular velocity, angular acceleration, geodetic position, sound, temperature, an image, a Blue Tooth signal, a Wi-Fi signal light, vibrations, pressure, biometrics, contents of surrounding atmosphere, a change in electric fields, a change in magnetic fields, a change in electro-magnetic fields, a change in velocity, a change in acceleration, a change in angular velocity, a change in angular acceleration, a change in geodetic position, a change in sound, a change in temperature, a change in light, a change in vibrations, a change in pressure, a change in biometrics, a change in contents of surrounding atmosphere and combinations thereof.

11. The method of claim 10, wherein said parameter detecting component is operable to detect, as the predetermined parameter, the user speaking via a microphone.

12. The method of claim 8, further comprising providing, via the parameter detecting component, the action signature to the database.

13. The method of claim 8, further comprising:

detecting, via the parameter detecting component, a second predetermined parameter, wherein said generating the action signature comprises generating the action signature based on the detected predetermined parameter and the detected second predetermined parameter.

14. The method of claim 8, wherein said parameter detecting component is operable to detect, as the predetermined parameter, the user speaking via a microphone.

15. A non-transitory, tangible, computer-readable media having computer-readable instructions stored thereon, for use with a database having stored therein, a plurality of signatures corresponding to a plurality of actions, respectively, the computer-readable instructions being capable of being read by a computer and being capable of instructing the computer to perform the method comprising;

determining, via a mode determining component, whether the device is in a predetermined mode;

determining, via a device location determining component, whether the device is located in a predetermined location;

detecting, via a parameter detecting component, a predetermined parameter;

generating, via the parameter detecting component, a action signature based on the detected predetermined parameter;

accessing, via an accessing component, one of the plurality of signatures from the database;

generating, via a comparing component, a comparison signal based on a comparison of the action signature and the one of the plurality of signatures; and modifying, via a mode controlling, component, operation of the device based on the comparison signal when the mode determining component determines that the device is operating in the predetermined mode and when the location determining component determines that the device is located in the predetermined location.

16. The non-transitory, tangible, computer-readable media of claim 15, the computer-readable instructions being capable of being read by a computer and being capable of instructing the computer to perform the method further comprising:

enabling, via a texting component, a user to perform at least one of creating an outgoing text and accessing a received text, wherein said detecting, via a parameter detecting component, a predetermined parameter comprises detecting, as the predetermined parameter, the user performing at least one of creating the outgoing text and accessing the received text via the texting component.

17. The non-transitory, tangible, computer-readable media of claim 16, wherein the computer-readable instructions are capable of instructing the computer to perform the method such that said detecting, as the predetermined parameter, the user performing at least one of creating the outgoing text and accessing the received text via the texting component comprises detecting at least one of magnetic fields, electric fields, electro-magnetic fields, velocity, acceleration, angular velocity, angular acceleration, geodetic position, sound, temperature, an image, a Blue Tooth signal, a Wi-Fi signal, light, vibrations, pressure, biometrics, contents of surrounding atmosphere, a change in electric fields, a change in magnetic fields, a change in electro-magnetic fields, a change in velocity, a change in acceleration, a change in angular velocity, a change in angular acceleration, a change in geodetic position, a change in sound, a change in temperature, a change in light, a change in vibrations, a change in pressure, a change in biometrics, a change in contents of surrounding atmosphere and combinations thereof.

18. The non-transitory, tangible, computer-readable media of claim 17, wherein the computer-readable instructions are capable of instructing the computer to perform the method such that said parameter detecting component is operable to detect, as the predetermined parameter, the user speaking via a microphone.

19. The non-transitory, tangible, computer-readable media of claim 15, the computer-readable instructions being capable of being read by a computer and being capable of instructing the computer to perform the method further comprising providing, via the parameter detecting component, the action signature to the database.

20. The non-transitory, tangible, computer-readable media of claim 15, the computer-readable instructions being capable of being read by a computer and being capable of instructing the computer to perform the method further comprising:
   detecting, via the parameter detecting component, a second predetermined parameter,
   wherein said generating the action signature comprises generating the action signature based on the detected predetermined parameter and the detected second predetermined parameter.

* * * * *